US012764831B2

(12) United States Patent
Patel

(10) Patent No.: US 12,764,831 B2
(45) Date of Patent: Oct. 13, 2026

(54) COMMUNICATION SYSTEM AND METHOD FOR ENABLING INACTIVITY TIMEOUT BASED ON TERMINAL TIMER

(71) Applicant: Giesecke+Devrient Mobile Security Germany GmbH, Munich (DE)

(72) Inventor: Praveen Patel, Pune (IN)

(73) Assignee: GIESECKE+DEVRIENT MOBILE SECURITY GERMANY GMBH, Munich (DE)

( * ) Notice: Subject to any disclaimer, the term of this patent is extended or adjusted under 35 U.S.C. 154(b) by 224 days.

(21) Appl. No.: 18/668,332

(22) Filed: May 20, 2024

(65) Prior Publication Data

US 2024/0397580 A1 Nov. 28, 2024

(30) Foreign Application Priority Data

May 25, 2023 (EP) ..................................... 23020254

(51) Int. Cl.
*H04W 76/38* (2018.01)
*H04W 76/25* (2018.01)
*H04W 76/32* (2018.01)

(52) U.S. Cl.
CPC ........... *H04W 76/38* (2018.02); *H04W 76/25* (2018.02); *H04W 76/32* (2018.02)

(58) Field of Classification Search
CPC ....... H04W 8/205; H04W 8/183; H04W 8/18; H04W 4/02; H04W 8/24; H04W 8/245; H04W 4/50; H04W 52/0251; H04W 8/20; H04W 4/60; H04W 88/02; H04W 8/08; H04L 2101/663; H04L 67/52;
(Continued)

(56) References Cited

U.S. PATENT DOCUMENTS

| | | | |
|---|---|---|---|
| 5,058,108 A | 10/1991 | Mann et al. | |
| 2007/0211700 A1 | 9/2007 | Hsieh et al. | |

(Continued)

FOREIGN PATENT DOCUMENTS

| | | |
|---|---|---|
| CN | 107846403 B | 9/2020 |
| JP | 2009016890 A | 1/2009 |

OTHER PUBLICATIONS

Extended European Search Report from corresponding EP Application No. 23020254.1, Oct. 23, 2023.

(Continued)

*Primary Examiner* — Olumide Ajibade Akonai
(74) *Attorney, Agent, or Firm* — Workman Nydegger

(57) ABSTRACT

The present invention relates to a system and method enabling inactivity timeout based on a terminal timer. The method includes steps of receiving, a UICC communicatively coupled with a terminal, a request for data packets having protocols from at least one server to establish communication between the server and the terminal, initiating, by the UICC, a timer command and enabling, by the UICC, the status of a server unresponsive flag to be at least one of a true and a false, based on the operating status of the at least one server, where the operating status of the at least one server is determined based on the established communication, and further terminating, by the UICC, the channel between the UICC and the terminal based on the status of the server unresponsive flag.

10 Claims, 5 Drawing Sheets

(58) Field of Classification Search
CPC . H04L 67/303; H04L 69/169; H04L 63/0853; H04L 67/14
See application file for complete search history.

(56) References Cited

U.S. PATENT DOCUMENTS

| | | | | |
|---|---|---|---|---|
| 2007/0239857 | A1* | 10/2007 | Mahalal | H04L 69/085 709/219 |
| 2009/0191917 | A1* | 7/2009 | Zappulla | H04L 69/169 455/558 |
| 2012/0142332 | A1* | 6/2012 | Li | H04W 4/50 455/419 |
| 2014/0146747 | A1* | 5/2014 | Dragan | H04L 61/106 370/328 |
| 2016/0088464 | A1 | 3/2016 | Hans | |
| 2021/0392491 | A1* | 12/2021 | Chen | H04W 8/22 |
| 2023/0171689 | A1* | 6/2023 | Kynsilehto | H04W 52/0206 370/311 |

OTHER PUBLICATIONS

"Smart Cards; Card Application Toolkit (CAT) (Release 17)" ETSI Draft Specification; 102 223, European Telecommunications Standards Institute (ETSI), 650, No. V17.1.0, Jul. 11, 2022, pp. 1-252.
"Remote Provisioning Architecture for Embedded UICC Test Specification Version 4.2", GSM Association, Jul. 31, 2020.

* cited by examiner

COMMUNICATION SYSTEM AND METHOD FOR ENABLING INACTIVITY TIMEOUT BASED ON TERMINAL TIMER

TECHNICAL FIELD

The present disclosure relates generally to the field of data transmission in communication networks. In particular, the present disclosure relates to a communication system and method for enabling inactivity timeout based on a terminal timer efficiently.

BACKGROUND

Background description includes information that may be useful in understanding the present invention. It is not an admission that any of the information provided herein is prior art or relevant to the presently claimed invention, or that any publication specifically or implicitly referenced is prior art.

In general, Over-The-Air Hypertext Transfer Protocol Secure (OTA-HTTP) involves the secure transfer of data between devices and servers over a wireless network, which is typically used in the context of updating software or firmware on a device remotely. The use of HTTPS ensures that the data being transmitted is encrypted and secure from interception or modification by unauthorized parties. OTA updates via HTTPS are commonly used in the context of mobile devices, IoT devices, and other embedded systems where software updates can be delivered remotely without requiring physical access to the device.

Further, in the context of OTA-HTTPS, a timer refers to the amount of time allowed for a particular operation or process to complete. For example, during an OTA update, a timer may be used to ensure that the transfer of data between the device and the server is completed within a specified period of time or to check if the communicating entity is alive/active. If the transfer takes longer than the allotted time, the connection may be terminated or the update process may be aborted to prevent errors or timeouts. A Bearer Independent Protocol (BIP) provides a set of commands and procedures that enable the device to communicate with the Subscriber Identity Module SIM card, in particular a Universal Integrated Circuit Card (UICC) which is typically embedded in a SIM card. The BIP commands may include transmitting data, setting up and tearing down connections, and managing the SIM card itself.

Integration tests in the customer's environment depict that in case of a connection problem, the SIM card/UICC cannot rely on getting informed from the device via the BIP, for example, a Data Download Event (CHANNEL STATUS—link-dropped). In that case, the Bearer Independent Protocol (BIP) channel is still open and may block any new session because typically UICC allows only one HTTP session at the same time. In this case, the server has no option to terminate the current session except if the user resets the SIM card.

Patent document number U.S. Pat. No. 5,058,108 titled local area network for digital data processing system discloses a scenario when a user requires the use of a service, the interface unit establishes a virtual circuit between the interface unit and the service provider and a service session which allows the user and the service provider to communicate over the virtual circuit. Each virtual circuit in the user's interface units includes a timer that reset when a message is transmitted over the virtual circuit and a data waiting flag set whenever data is present to be transmitted over the virtual circuit. Another patent document number JP2009016890 titled Remote Control System discloses an equipment control unit that controls the equipment to be controlled according to the control request command, and timing management information. Yet another patent application US20070211700 titled Network device and method for retrieving VoIP configuration parameters, discloses receiving data sent by the server corresponding to the data retrieval request and parsing the data to determine VoIP configuration parameters when the response is correct.

However, there is a need in the art to provide an improved and secure communication system and method for enabling inactivity timeout based on the terminal timer.

OBJECTS OF THE PRESENT DISCLOSURE

Some of the objects of the present disclosure, which at least one embodiment herein satisfy are as listed herein below.

It is an object of the present disclosure to overcome the above drawbacks, shortcomings, and limitations associated with existing communication between the server and UICC.

It is an object of the present disclosure to provide an improved user experience, where responsive communication allows for faster and more efficient communication between the server and UICC. Thereby, translating into a better user experience, with faster response times, smoother data transfers, and more reliable connections.

It is an object of the present disclosure to provide increased flexibility which enables the UICC-based applications to adapt to changing network conditions and device capabilities. Thereby, ensuring that the UICC-based applications continue to function effectively across a wide range of devices and network environments.

It is an object of the present disclosure to enable device timers/terminal timers to manage the update process in OTA-HTTPS, which ensures that it is efficient, secure, and reliable communication.

SUMMARY

The present disclosure relates generally to the field of data transmission in communication networks. In particular, the present disclosure relates to a communication system and method for enabling inactivity timeout based on a terminal timer efficiently.

An aspect of the present disclosure pertains to a communication system for enabling an inactivity timeout based on a terminal timer efficiently. The system comprises one or more processors coupled with a memory. The memory is configured to store instructions which when executed by the one or more processors causes the system to receive, by a Universal Integrated Circuit Card (UICC) communicatively coupled with a terminal, a request for one or more data packets having one or more protocols from at least one server to establish communication between the UICC and the at least one server. The UICC is configured to initiate a timer command to a timer associated with the terminal upon transferring the one or more received data packets to the terminal. The UICC further enables the status of a server unresponsive flag to be at least one of a true and a false, based on an operating status of the at least one server, where the operating status of the at least one server is determined based on the established communication. Further, the UICC terminates the channel between the UICC and the terminal based on the status of the server unresponsive flag.

In an aspect, when the operating status of the at least one server is inactive, the status of the server unresponsive flag may be enabled as true, and correspondingly the inactivity timeout timer may be enabled and the transfer of the one or more protocols between the terminal and the UICC may be discontinued.

In an aspect, when the operating status of the at least one server is active, the status of the server unresponsive flag may be enabled as false and the UICC may reinitiate the timer command to the terminal that may enable the terminal to receive data from the at least one server.

Another aspect of the present disclosure pertains to a method for enabling an inactivity timeout based on a terminal timer. The method comprises a step of receiving, by a Universal Integrated Circuit Card (UICC) communicatively coupled with a terminal, a request for one or more data packets having one or more protocols from at least one server to establish communication between the at least one server and the terminal. The method further comprises steps of initiating, by the UICC, a timer command to a timer associated with the terminal upon transferring the one or more received data packets to the terminal, and further enabling the status of a server unresponsive flag to be at least one of a true and a false, based on an operating status of the at least one server, where the operating status of the at least one server is determined based on the established communication. Further, the method comprises a step of terminating, by the UICC, the channel between the UICC and the terminal based on the status of the server unresponsive flag.

In an aspect, when the operating status of the at least one server is inactive, the method may comprise the step of enabling the status of the server unresponsive flag as true, and correspondingly enabling the inactivity timeout timer and discontinuing the transfer of the one or more protocols between the terminal and the UICC.

In another aspect, when the operating status of the at least one server is active, the method may comprise the step of enabling the status of the server unresponsive flag as false and reinitiating, by the UICC, the timer command to the terminal that enables the terminal to receive data from the at least one server.

In yet another aspect, the one or more protocols may comprise a Bearer Independent Protocol (BIP), where the BIP may comprise at least one of a command and an event. The commands may comprise at least one of an open channel, a close channel, a send data, and a receive data. The events may comprise at least one of a data available, and a channel status.

In yet another aspect, the UICC may comprise at least one of a smart card module, a microcontroller, a secure element for authentication and encryption, and an embedded operating system for executing applications and communicating with a terminal network.

Thus, the present disclosure provides an improved and reliable communication system and method for enabling inactivity timeout based on a terminal timer efficiently. The terminal timers are one of the critical tools in managing the various processes involved in OTA updates over HTTPS, helping to ensure that these updates occur in a timely and efficient manner. The terminal timers can help prevent errors, improve network efficiency, and ensure a positive user experience.

Various objects, features, aspects, and advantages of the present disclosure will become more apparent from the following detailed description of preferred embodiments, along with the accompanying drawing figures in which like numerals represent like features.

Within the scope of this application, it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF DRAWINGS

The accompanying drawings are included to provide a further understanding of the present invention and are incorporated in and constitute a part of this specification. The drawings illustrate exemplary embodiments of the present invention and, together with the description.

DETAILED DESCRIPTION

Figure 1:
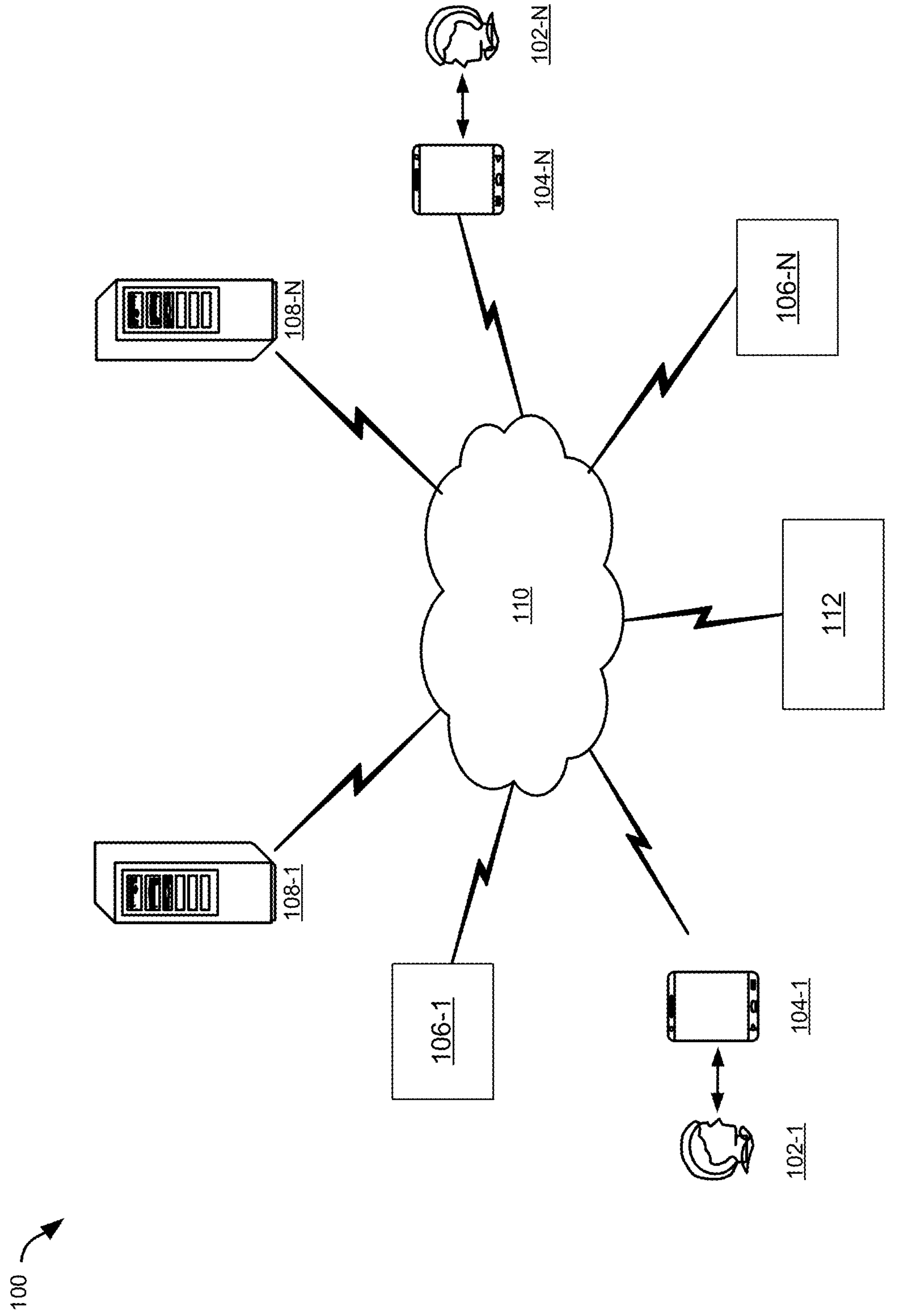
FIG. 1 illustrates an exemplary network architecture of the proposed communication system for enabling an inactivity timeout based on a terminal timer, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

The present disclosure relates generally to the field of data transmission in communication networks. In particular, the present disclosure relates to a communication system and method for enabling inactivity timeout session based on terminal timer.

According to an aspect, the present disclosure elaborates upon a communication system for enabling an inactivity timeout based on a terminal timer efficiently. The system includes one or more processors coupled with a memory. The memory is configured to store instructions which when executed by the one or more processors causes the system to receive, by a Universal Integrated Circuit Card (UICC) communicatively coupled with a terminal, a request for one or more data packets having one or more protocols from at least one server to establish communication between the terminal and the at least one server. The UICC is configured to initiate a timer command to a timer associated with the terminal upon transferring the one or more received data packets to the terminal. The UICC further enables the status of a server unresponsive flag to be at least one of a true and a false, based on an operating status of the at least one server, where the operating status of the at least one server is determined based on the established communication. Further, the UICC terminates the channel between the UICC and the terminal based on the status of the server unresponsive flag.

In an embodiment, when the operating status of the at least one server is inactive, the status of the server unresponsive flag can be enabled as true, and correspondingly the inactivity timeout can be enabled and the transfer of the one or more protocols between the terminal and the UICC can be discontinued.

In an embodiment, when the operating status of the at least one server is active, the status of the server unresponsive flag can be enabled as false and the UICC can reinitiate the timer command to the terminal that enables the terminal to receive data from the at least one server.

According to another aspect, the present disclosure elaborates upon a method for enabling an inactivity timeout based on a terminal timer. The method includes a step of receiving, by a Universal Integrated Circuit Card (UICC) communicatively coupled with a terminal, a request for one or more data packets having one or more protocols from at least one server to establish communication between the at least one server and the terminal. The method further includes steps of initiating, by the UICC, a timer command to a timer associated with the terminal upon transferring the one or more received data packets to the terminal, and further enabling the status of a server unresponsive flag to be at least one of a true and a false, based on an operating status of the at least one server, where the operating status of the at least one server is determined based on the established communication. Further, the method includes a step of terminating, by the UICC, the channel between the UICC and the terminal based on the status of the server unresponsive flag.

In an embodiment, when the operating status of the at least one server is inactive, the method can include the step of enabling the status of the server unresponsive flag as true, and correspondingly enabling the inactivity timeout and discontinuing the transfer of the one or more protocols between the terminal and the UICC.

In another embodiment, when the operating status of the at least one server is active, the method can include the step of enabling the status of the server unresponsive flag as false and reinitiating, by the UICC, the timer command to the terminal that enables the terminal to receive data from the at least one server In yet another embodiment, the one or more protocols can include a Bearer Independent Protocol (BIP), where the BIP can include at least one of a command and an event. The commands can include at least one of an open channel, a close channel, a send data, and a receive data. The events can include at least one of a data available, and a channel status.

In yet another embodiment, the UICC can include at least one of a smart card module, a microcontroller, a secure element for authentication and encryption, and an embedded operating system for executing applications and communicating with a terminal network.

Over-The-Air Hypertext Transfer Protocol Secure (OTA-HTTP) involves the secure transfer of data between devices and servers over a wireless network, which is typically used in the context of updating software or firmware on a device remotely. The use of HTTPS ensures that the data being transmitted is encrypted and secure from interception or modification by unauthorized parties. OTA updates via HTTPS are commonly used in the context of mobile devices, IoT devices, and other embedded systems where software updates can be delivered remotely without requiring physical access to the device. Further, in the context of OTA-HTTPS, a timer refers to the amount of time allowed for a particular operation or process to complete. For example, during an OTA update, a timer may be used to ensure that the transfer of data between the device and the server is completed within a specified period of time or to check if the communicating entity is alive/active. If the transfer takes longer than the allotted time, the connection may be terminated or the update process may be aborted to prevent errors or timeouts. A Bearer Independent Protocol (BIP) provides a set of commands and procedures that enable the device to communicate with the Subscriber Identity Module SIM card, in particular a Universal Integrated Circuit Card (UICC) which is typically embedded in a SIM card. The BIP commands may include transmitting data, setting up and tearing down connections, and managing the SIM card itself.

FIG. 1 illustrates an exemplary network architecture of the proposed communication system for enabling an inactivity timeout based on a terminal timer, in accordance with an embodiment of the present disclosure.

Referring to FIG. 1, the exemplary network architecture of the proposed communication system for enabling an inactivity timeout based on a terminal timer is disclosed. The proposed communication system "system" 100 can include one or more terminals 104-1, 104-2 . . . 104-N (collectively referred to as the terminal 104, and interchangeably referred to as computing device 104, and Mobile Equipment (ME) 104, herein) associated with one or more users 102-1, 102-2 . . . 102-N (collectively referred as the user 102). The system 100 can further include at least one Universal Integrated Circuit Card (UICC) 106-1, 106-2, . . . , 106-N (collectively referred to as the UICC 106) that can be in communication with and associated with one of the terminals 104. The system 100 can further include at least one server 108-1, 108-2, . . . , 108-N (collectively referred to as the server 108), and a communication network 110. The terminal 104, the UICC 106, and the server 108 can be in communication with each other through the communication network 110.

In an embodiment, the proposed system 100 can be configured to enable an inactivity timeout based on a terminal timer associated with the terminal/ME 104. The system 100 can include at least one processing device 112 comprising one or more processors coupled with a memory. The memory can be configured to store instructions which when executed by the one or more processors causes the system 100 to receive, by the UICC 106, a request for one or more data packets having one or more protocols from at least one server 108 to establish communication between the corresponding server 108 and the terminal/ME 104. The protocols can include a Bearer Independent Protocol (BIP), where the BIP can include at least one of a command and an event. The commands can include but are not limited to an open channel, a close channel, a send data, a receive data, and the like. Further, the events can include but are not limited to data available, channel status, and the like.

Further, the UICC 106 can be configured to initiate a timer command to a timer associated with the terminal 104 upon transferring the received data packets to the terminal. The UICC 106 can further enable the status of a server unresponsive flag to be at least one of a true and a false, based on an operating status of the at least one server 108, where the operating status of the server 108 is determined based on the established communication. For instance, when the established communication or data transfer from the server 108 to the terminal 104 is stopped, the operating status of the server 108 can be considered inactive. Further, when the established communication or data transfer from the server 108 to the terminal 104 is active, the operating status of the server 108 is considered active.

In an embodiment, when the operating status of the server 108 is inactive, the status of the server unresponsive flag can be enabled as true, and correspondingly the inactivity timeout timer can be enabled and the transfer of the protocols between the terminal 104 and the UICC 106 can be discontinued. Further, in another embodiment, when the operating status of the server 108 is active, the status of the server unresponsive flag can be enabled as false and the UICC 106 can reinitiate the timer command to the terminal 104 which can enable the terminal 104 to receive data from the server 108.

In an exemplary embodiment, the UICC 106 can include at least one of a smart card module, a microcontroller, a secure element for authentication and encryption, and an embedded operating system for executing applications and communicating with a terminal network. Finally, the UICC 106 can be configured to terminate the timer command based on the inactivity timeout of the terminal timer.

In an embodiment, the terminal/ME 104 may communicate with the server 108 and UICC 106 via a set of executable instructions residing on any operating system, including but not limited to, Android™, iOS™, Kai OS™, Windows™, and the like. In an embodiment, the computing device/terminal/ME 104 may include, but is not limited to, any electrical, electronic, electro-mechanical, or equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touchpad, touch-enabled screen, electronic pen and the like. It may be appreciated that the computing device/terminal/ME 104 may not be restricted to the mentioned devices and various other devices may be used. A smart computing device may be one of the appropriate systems for storing data and other private/sensitive information.

In another exemplary embodiment, the server 108 may include or comprise, by way of example but not limitation, one or more of a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

In another exemplary embodiment, the communication network 110 can be a wireless network, a wired network, or a combination thereof that is implemented as one of the different types of networks, such as Mobile GSM network, Intranet, Local Area Network (LAN), Wide Area Network (WAN), Internet, and the like as the case may be. Further, network 110 can either be a dedicated network or a shared network. The shared network represents an association of the different types of networks that uses a variety of protocols, for example, Hypertext Transfer Protocol (HTTP), Transmission Control Protocol/Internet Protocol (TCP/IP), Wireless Application Protocol (WAP), and the like.

The processing device 112 may be implemented as a combination of hardware and programming (for example, programmable instructions) to implement one or more functionalities of the one or more processors. In examples described herein, such combinations of hardware and programming may be implemented in several different ways. For example, the programming for the one or more processors may be processor executable instructions stored on a non-transitory machine-readable storage medium and the hardware for the one or more processors may comprise a processing resource (for example, one or more processors), to execute such instructions. In the present examples, the machine-readable storage medium may store instructions that, when executed by the processing resource, implement the one or more processors. In such examples, the system 100 may comprise the machine-readable storage medium storing the instructions and the processing resource to execute the instructions, or the machine-readable storage medium may be separate but accessible to the system and the processing resource. In other examples, the one or more processors may be implemented by electronic circuitry. In an aspect, the database may comprise data that may be either stored or generated as a result of functionalities implemented by any of the components of the processor or the processing engines.

Figure 2:
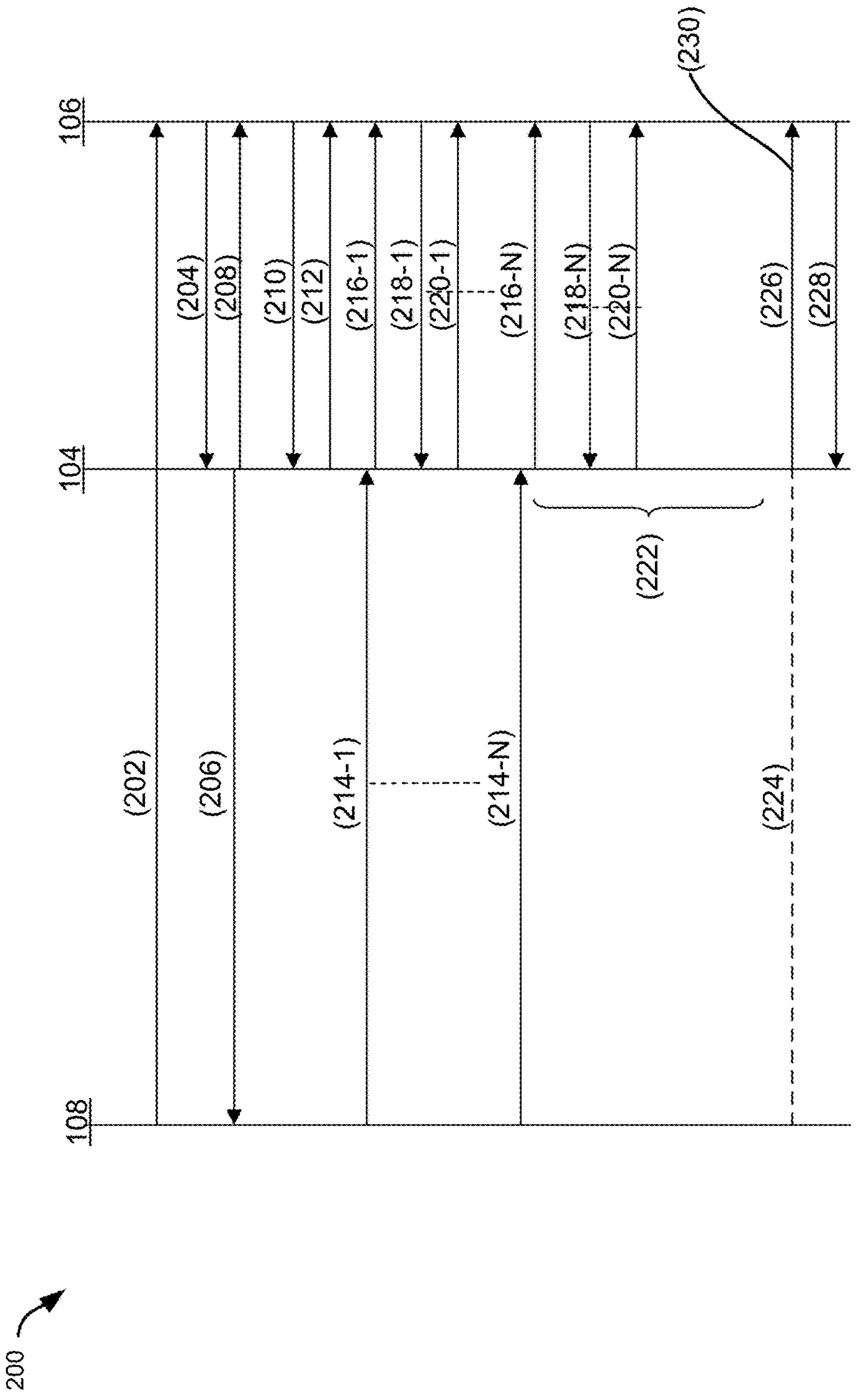
FIG. 2 (PRIOR ART)
FIG. 2 illustrates a data flow diagram of an existing system for detecting a server unresponsive by a timer running at the terminal.

FIG. 2 illustrates a data flow diagram of an existing system for detecting a server 108 unresponsive by a timer running at the terminal or mobile equipment (ME) 104.

As illustrated in FIG. 2, in the existing system 200, in order to detect idle conditions or inactivity timeout i.e. there is no communication between the server 108 and the UICC 108 (embedded in terminal/ME 104) for a long time, a timer running at the terminal/ME side 104 can be used. Initially, at step 202, a request for an open channel can be sent by the server 108 to the UICC 106 in the form of SMS. Further, the UICC 106 can send a BIP open channel command to the terminal/ME 104 at step 204, where the terminal/ME 104 can send a terminal response to the UICC 106 at step 206, and correspondingly a TCP/IP connection can be established between the terminal/ME 104 and the server 108 at step 208. Accordingly, after the terminal response of the BIP Open channel command, the UICC 106 can send a start Timer command to a timer associated with the terminal/ME 104 at step 210 which can start the timer, and the terminal/ME 104 can correspondingly send a response to the UICC 106 at step 212. Further, on every data received by the terminal/ME 104 from the server 108 (data available event) at steps 214-1 to 214-N, the terminal/ME 104 may send data available event to the UICC 106 at steps 216-1 to 216-N and the UICC 106 can again send timer management command at step 218-1 to 218-N to restart same timer again to avoid timer expiration and correspondingly receive a terminal response at steps 220-1 to 220-N. During the process, the timer keeps running at step 222 until the timer is reset or restarted. Further, if no communication response is detected by the terminal 104 from the server 108 at step 224 and the timer is expired at the terminal/ME 104, now the terminal/ME 104 can send a timer expiration event command to the UICC 106 at step 226 so that the UICC 106 can close BIP channel between the terminal/ME 104 and the UICC 106 at step 228 without getting informed from the server 108 and the server 108 becomes unresponsive at step 230.

Figure 3:
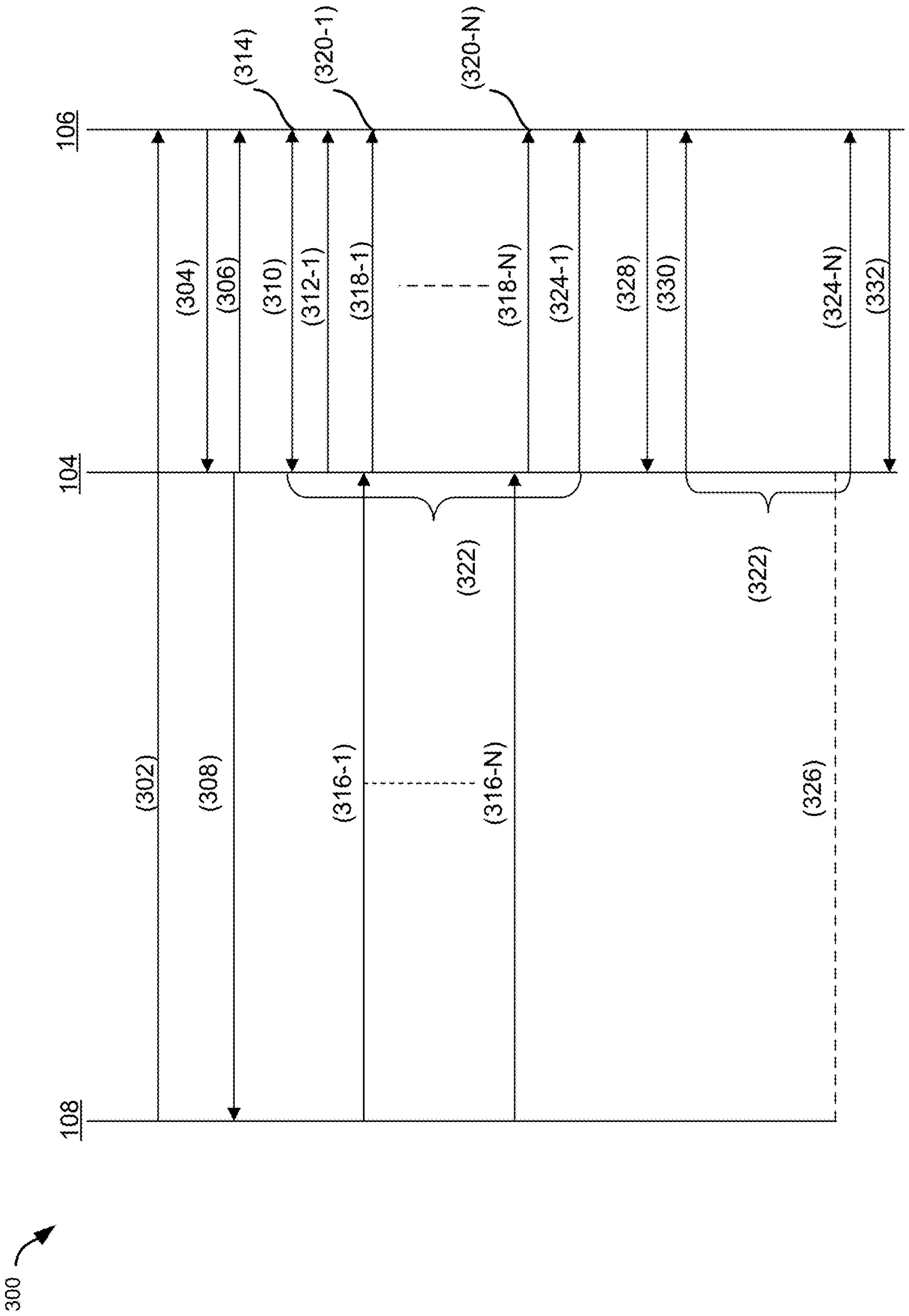
FIG. 3 illustrates a data flow diagram of the proposed communication system for enabling an inactivity timeout based on a terminal timer efficiently, in accordance with an embodiment of the present disclosure.
Figure 4:
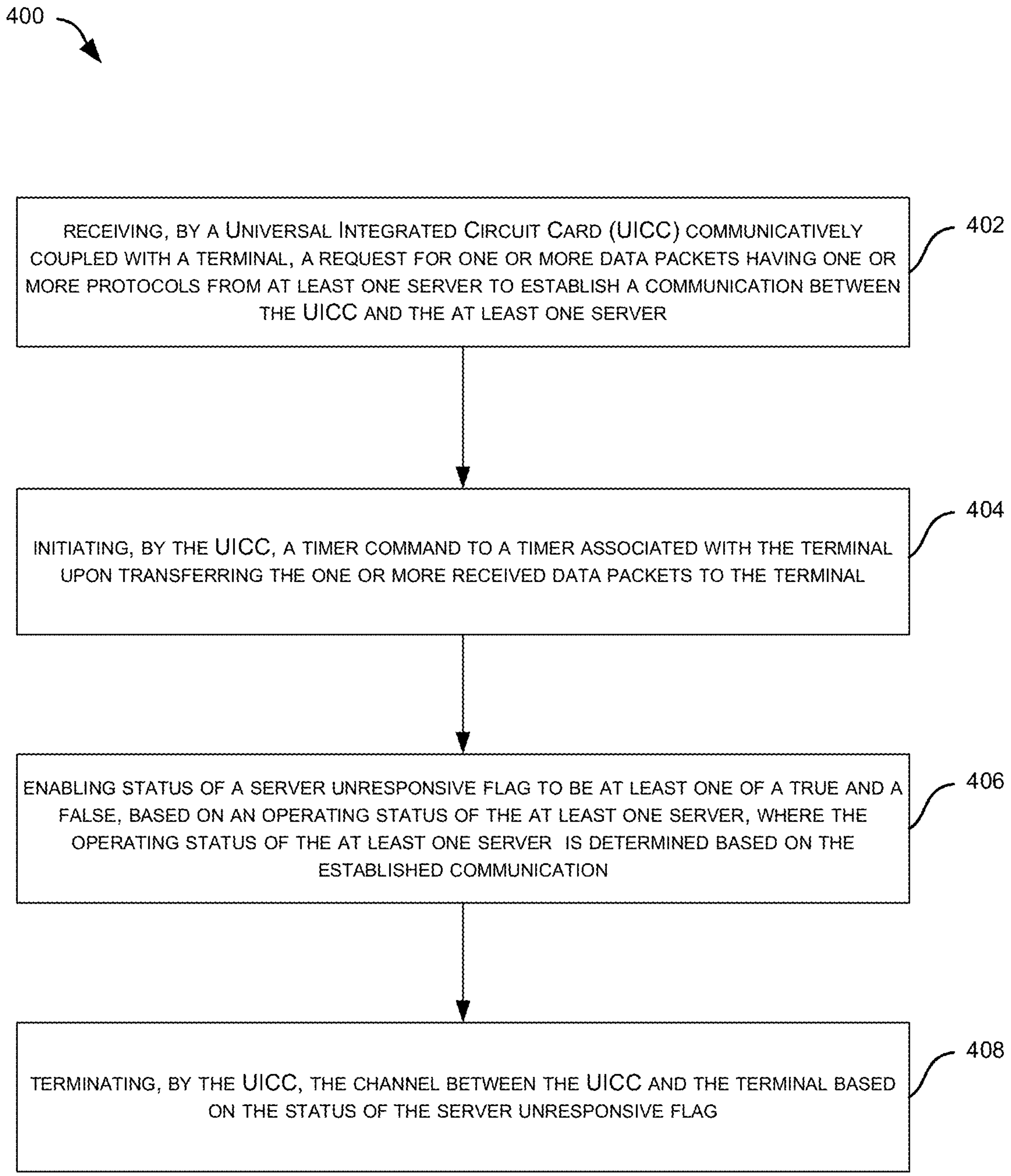
FIG. 4 illustrates a method for enabling an inactivity timeout based on a terminal timer efficiently, in accordance with an embodiment of the present disclosure.

It would be obvious to a person skilled in the art that the existing system 200 of FIG. 2 does not have a direct method to detect server unresponsiveness by the timer running at the terminal/ME side 104. This technical problem associated with existing system 200 has been overcome by the proposed system 100, as illustrated in FIGS. 3 and 4, where after the terminal response of the BIP Open channel command, the UICC 106 can be configured to send "a Timer management command", which may start the timer at the terminal/ME side 104. Accordingly, on every data received from server 108 (data available event), the UICC 106 in the proposed system 100 can be configured to initiate the timer management command to restart the same timer again and to avoid timer expiration. Further, if there is no communication from the server 108, the timer can expire at the terminal/ME 104. In continuation, the terminal/ME 104 can send a timer expiration event to the UICC 106, based on which the UICC 106 may close the BIP channel between the terminal/ME 104 and the UICC 106 without getting informed from the server 108.

However, in the existing system 200 (as shown in FIG. 2), for every data available event from the server 108 (Data available event) there are 2 extra commands related to timer management command (start the timer and terminal response for same) which are overhead and may hamper the performance and battery consumption. For instance, if users want to download a 20 KB applet in UICC 106 using HTTPS then there may be around >109 data available events which may add >218 extra commands which may impact the performance of the overall system.

FIG. 3 illustrates a data flow diagram of the proposed communication system for enabling an inactivity timeout based on a terminal timer, in accordance with an embodiment of the present disclosure.

As illustrated in FIG. 3, in the proposed system 300, in order to detect idle conditions or inactivity timeout i.e. there is no communication between the server 108 and the UICC 108 (embedded in terminal/ME 104) for a long time, a timer running at the terminal/ME side 104 may be used. Initially, at step 302, a request for an open channel can be sent by the server 108 to the UICC 106 in the form of SMS. Further, the UICC 106 can send a BIP open channel command to the terminal/ME 104 at step 304, where the terminal/ME 104 may send a terminal response to the UICC 106 at step 306 and correspondingly a TCP/IP connection may be established between the terminal/ME 104 and the server 108 at step 308. Accordingly, after the terminal response of the BIP Open channel command, the UICC 106 can send a start Timer command to the terminal/ME 104 at step 310 which may start the timer at the terminal/ME 104 side and the terminal/ME 104 can correspondingly send a response to the UICC 106 at step 312-1. After the Timer management command sent by the UICC 106 at step 310, a "server_unresponsive flag" can be set as true by the UICC at step 314. Further, on every data received by the terminal/ME 104 from the server 108 (data available event) at steps 316-1 to 316-N, the terminal/ME 104 may send data available event to the UICC 106 at steps 318-1 to 318-N during the process the timer keeps running at step 322 until reaches its maximum value. On every data available event (i.e. data received from the server 108) at steps 318-1 to 318-N, the "server_unresponsive flag" can be set as false by the UICC at steps 320-1 to 320-N. Further, when the timer reaches its maximum value, the terminal/ME 104 can inform the UICC 106 using the timer expiration event at steps 324-1 to 324-N. In the UICC 106, on every timer expiration event, the UICC 106 can be configured to check the "server_unresponsive flag" status to be at least one of a true and a false. The status of the server unresponsive flag can be true when the server is detected to be inactive or no response from the server is received at step 326. Accordingly, the protocol transfer between the terminal 104 and the UICC 106 can be discontinued at step 332 Further, the status of the server unresponsive flag can be false when the server 108 is active. Accordingly, the UICC 106 can further reinitiate the timer command to the terminal/ME to receive data from the server 108 at step 328 and the terminal/ME 104 may correspondingly send a response to the UICC at step 330. It is to be appreciated by a person skilled in the art that there are no extra commands related to the "timer management command" on every data available event in the present invention 100. The extra commands are moved on every timer expiration event which does not pop up at frequent intervals as compared to the data available event in FIG. 2. For example, if users have set the inactivity time value as 90 sec, then on every 90 sec these extra commands may get executed.

In an embodiment, Table 1 below provides a performance comparison between the existing system of FIG. 2 and the proposed system of FIG. 3 for downloading a 20 KB applet takes 40 sec time, where Inactivity timeout is set to 90 sec. The focus of in-activity timeout relates to a scenario when the server 108 becomes unresponsive, the BIP channel opened at UICC 106 must be terminated, and the time accuracy is not an important factor.

TABLE 1

| | FIG. 2 - Existing system | FIG. 3- Proposed system |
|---|---|---|
| Time consumed by applet download in card | 40 sec + time is taken by extra timer management command | Only 40 sec because after that server closes the hence no extra command |

FIG. 4 illustrates a method for enabling an inactivity timeout based on a terminal timer, in accordance with an embodiment of the present disclosure.

Referring to FIG. 4, method 400 for enabling an inactivity timeout based on a terminal timer is disclosed. Method 400 can include step 402 of receiving, by a Universal Integrated Circuit Card (UICC) communicatively coupled with a terminal, a request for one or more data packets having one or more protocols from at least one server to establish communication between the at least one server and the terminal. Further, method 400 can include step 404 of initiating, by the UICC, a timer command to a timer associated with the terminal upon transferring the received data packets to the terminal. Method 400 can further include step 406 of enabling, by the UICC, the status of a server unresponsive flag to be at least one of a true and a false, based on an operating status of the at least one server, where the operating status of the at least one server is determined based on the established communication. Furthermore, method 400 can include step 408 of terminating, by the UICC, the channel between the UICC and the terminal based on the status of the server unresponsive flag.

In an embodiment, when the operating status of the at least one server is inactive, the method 400 can include the step of enabling the status of the server unresponsive flag as true, and correspondingly enabling the inactivity timeout and discontinuing the transfer of the one or more protocols between the terminal and the UICC. Further, in another embodiment, when the operating status of the at least one server is active, method 400 can include the step of enabling the status of the server unresponsive flag as false and reinitiating, by the UICC, the timer command to the terminal that can enable the terminal to receive data from the at least one server.

Figure 5:
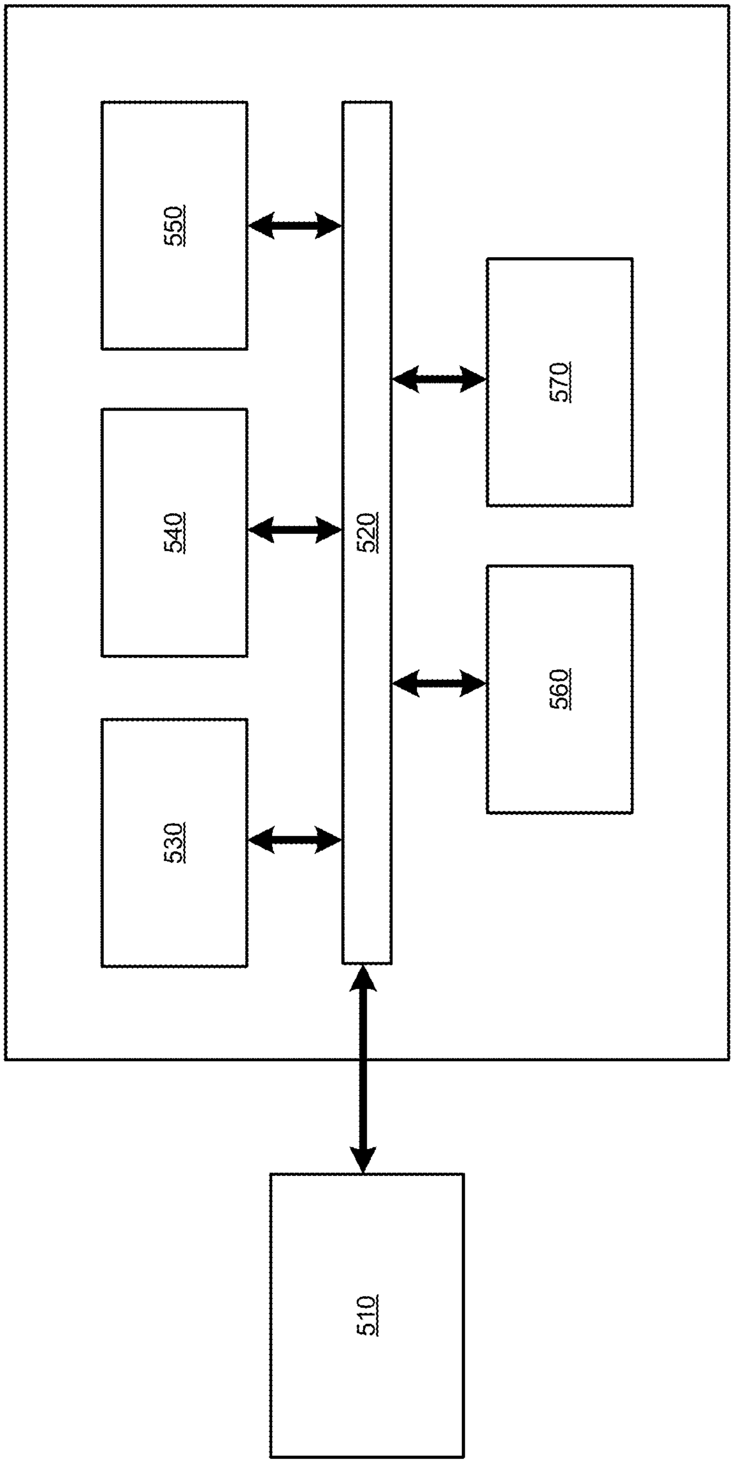
FIG. 5 illustrates an exemplary computer system in which or with which the processing device, the server, and the terminal of the present invention can be utilized, in accordance with embodiments of the present disclosure.

Referring to FIG. 5, a computer system 500 in which or with which the server 108, the processing device 112, and the mobile equipment 104 of the system 100 may be implemented for enabling an inactivity timeout based on a terminal timer of the proposed system 100 and method 400 is disclosed. The computer system 500 includes an external storage device 510, a bus 520, a main memory 530, a read-only memory 540, a mass storage device 560, a communication port 560, and a processor(s) 570. The processor 570 is implemented as one or more microprocessors, microcomputers, microcontrollers, digital signal processors, central processing units, logic circuitries, and/or any devices that manipulate data based on operational instructions. Among other capabilities, processor(s) 570 are configured to fetch and execute computer-readable instructions stored in a memory of the sink device. The memory 540 stores one or more computer-readable instructions or routines, which are fetched and executed to create or share the data units over a network service. Memory 530, 540 comprise any non-transitory storage device comprising, for example, volatile memory such as RAM, or non-volatile memory such as EPROM, flash memory, and the like.

In an embodiment, the computer system 500 also comprises an interface(s). The interface(s) comprises a variety of interfaces, for example, interfaces for data input and output devices referred to as I/O devices, storage devices, and the like. The interface(s) facilitates communication between the server 108, ME 104, and UICC 106 with the processing device 112. The interface(s) also provides a communication pathway for one or more components of the server 108, terminal/ME 104, and UICC 106. Examples of such components comprise, but are not limited to, processing engine(s) and database. The interface comprises a platform for communication with the devices/servers to read real-time data/write data in the server 108, ME 104, and UICC 106, respectively, and to communicate with the other devices. Interfaces comprise a Graphical interface that allows user to feed inputs, to type/write/upload the data and certificates, and other software and hardware interfaces, for example, interfaces for peripheral device(s), such as a keyboard, a mouse, an external memory, and a printer.

A person skilled in the art will appreciate that computer system 500 may include more than one processor and communication ports. Examples of processor 570 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 570 may include various modules associated with embodiments of the present invention. Communication port 560 can be any of an RS-232 port for use with a modem-based dialup connection, a 10/100 Ethernet port, a Gigabit or 10 Gigabit port using copper or fiber, a serial port, a parallel port, or other existing or future ports. Communication port 760 may be chosen depending on a network, such a Local Area Network (LAN), Wide Area Network (WAN), or any network to which the computer system connects.

In an embodiment, the memory 530 can be Random Access Memory (RAM), or any other dynamic storage device commonly known in the art. Read only memory can be any static storage device(s) e.g., but not limited to, a Programmable Read Only Memory (PROM) chips for storing static information e.g., start-up or BIOS instructions for processor 570. Mass storage 560 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

In an embodiment, the bus 520 communicatively couples the processor(s) 570 with the other memory, storage, and communication blocks. Bus 520 can be, e.g. a Peripheral Component Interconnect (PCI)/PCI Extended (PCI-X) bus, Small Computer System Interface (SCSI), USB or the like, for connecting expansion cards, drives, and other subsystems as well as other buses, such a front side bus (FSB), which connects processor 570 to a software system.

In another embodiment, operator and administrative interfaces, e.g. a display, keyboard, and a cursor control device, may also be coupled to bus 520 to support direct operator interaction with computer system 400. Other operator and administrative interfaces can be provided through network connections connected through communication port 460. External storage device 510 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are comprised to enable a person having ordinary skill in the art to make and use the invention when combined with information and knowledge available to the person having ordinary skill in the art.

Advantages of the Invention

The proposed invention overcomes the above drawbacks, shortcomings, and limitations associated with existing communication between the server and UICC.

The proposed invention provides an improved user experience, where responsive communication allows for faster and more efficient communication between the server and UICC. Thereby, translating into a better user experience, with faster response times, smoother data transfers, and more reliable connections.

The proposed invention increased flexibility which enables the UICC-based applications to adapt to changing network conditions and device capabilities. Thereby, ensuring that the UICC-based applications continue to function effectively across a wide range of devices and network environments.

The proposed invention enables terminal timers to manage the update process in OTA-HTTPS, which ensures that it is efficient, secure, and reliable communication.

The invention claimed is:

1. A communication system for enabling an inactivity timeout based on a terminal timer, the system comprising:

a processing device including one or more processors coupled with a memory, wherein the memory stores instructions which when executed by the one or more processors causes the system to:

receive, by a Universal Integrated Circuit Card (UICC) communicatively coupled with a terminal, a request for one or more data packets having one or more protocols from at least one server to establish communication between the UICC and the at least one server;

initiate, by the UICC, a timer command to a timer associated with the terminal upon transferring the one or more received data packets to the terminal;

enable, by the UICC, status of a server unresponsive flag to be at least one of a true and a false, based on an operating status of the at least one server, wherein the operating status of the at least one server is determined based on the established communication; and terminate, by the UICC, the channel between the UICC and the terminal based on the status of the server unresponsive flag.

2. The system as claimed in claim 1, wherein when the operating status of the at least one server is inactive, the status of the server unresponsive flag is enabled as true, and correspondingly the inactivity timeout is enabled and the transfer of the one or more protocols between the terminal and the UICC is discontinued.

3. The system as claimed in claim 1, wherein when the operating status of the at least one server is active, the status of the server unresponsive flag is enabled as false and the UICC reinitiates the timer command to the terminal that enables the terminal to receive data from the at least one server.

4. The system as claimed in claim 1, wherein the one or more protocols include a Bearer Independent Protocol (BIP), wherein the BIP includes at least one of a command and an event, wherein the command includes at least one of an open channel, a close channel, a send data, and a receive data, wherein the event includes at least one of a data available, and a channel status.

5. The system as claimed in claim 1, wherein the UICC includes at least one of a smart card module, a microcontroller, a secure element for authentication and encryption, and an embedded operating system for executing applications and communicating with a terminal network.

6. A method for enabling an inactivity timeout based on a terminal timer, the method comprising the steps of:

receiving, by a Universal Integrated Circuit Card (UICC) communicatively coupled with a terminal, a request for one or more data packets having one or more protocols from at least one server to establish a communication between the UICC and the at least one server;

initiating, by the UICC, a timer command to a timer associated with the terminal upon transferring the one or more received data packets to the terminal;

enabling, by the UICC, status of a server unresponsive flag to be at least one of a true and a false, based on an operating status of the at least one server, wherein the operating status of the at least one server is determined based on the established communication; and terminating, by the UICC, the channel between the UICC and the terminal based on the status of the server unresponsive flag.

7. The method as claimed in claim 6, wherein when the operating status of the at least one server is inactive, the method comprises the step of enabling the status of the server unresponsive flag as true, and correspondingly enabling the inactivity timeout timer and discontinuing the transfer of the one or more protocols between the terminal and the UICC.

8. The method as claimed in claim 6, wherein when the operating status of the at least one server is active, the method comprises the step of enabling the status of the server unresponsive flag as false and reinitiating, by the UICC, the timer command to the terminal that enables the terminal to receive data from the at least one server.

9. The method as claimed in claim 6, wherein the one or more protocols include a Bearer Independent Protocol (BIP), wherein the BIP includes at least one of a command and an event, wherein the command includes at least one of a open channel, a close channel, a send data, and a receive data, wherein the event includes at least one of a data available, and a channel status.

10. The method as claimed in claim 6, wherein the UICC includes at least one of a smart card module, a microcontroller, a secure element for authentication and encryption, and an embedded operating system for executing applications and communicating with a terminal network.

* * * * *